(12) United States Patent
Nonaka et al.

(10) Patent No.: US 8,056,591 B2
(45) Date of Patent: Nov. 15, 2011

(54) PNEUMATIC TIRE WITH TREAD HAVING GROUND CONTACT SHAPE AND UNEVEN WEAR SACRIFICIAL PROTRUSION

(75) Inventors: Mie Nonaka, Kodaira (JP); Naomichi Funato, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1152 days.

(21) Appl. No.: 11/630,576

(22) PCT Filed: Jun. 22, 2005

(86) PCT No.: PCT/JP2005/011410
§ 371 (c)(1),
(2), (4) Date: Jul. 17, 2007

(87) PCT Pub. No.: WO2006/001290
PCT Pub. Date: Jan. 5, 2006

(65) Prior Publication Data
US 2007/0289684 A1    Dec. 20, 2007

(30) Foreign Application Priority Data
Jun. 23, 2004    (JP) ................................ 2004-185055

(51) Int. Cl.
*B60C 11/04* (2006.01)
*B60C 11/13* (2006.01)

(52) U.S. Cl. ......... 152/209.14; 152/209.16; 152/209.19; 152/209.27; 152/901

(58) Field of Classification Search ............... 152/209.1, 152/209.14, 209.16, 209.18, 209.19, 209.27, 152/DIG. 1, 901, 454
See application file for complete search history.

(56) References Cited

U.S. PATENT DOCUMENTS

| 5,445,201 | A | * | 8/1995 | Kukimoto et al. ........ 152/209.19 |
| 6,082,424 | A | | 7/2000 | Miyazaki |
| 6,722,408 | B2 | * | 4/2004 | Naito ....................... 152/209.14 |
| 2004/0069392 | A1 | | 4/2004 | Maruoka et al. |
| 2004/0079460 | A1 | * | 4/2004 | Maruoka et al. ......... 152/209.14 |
| 2005/0016656 | A1 | * | 1/2005 | Kuroki et al. ................ 152/548 |

(Continued)

FOREIGN PATENT DOCUMENTS

EP        0 318 287 A2    5/1989

(Continued)

OTHER PUBLICATIONS

Machine translation for Japan 11-151911 (no date).*

(Continued)

*Primary Examiner* — Steven D Maki
(74) *Attorney, Agent, or Firm* — Sughrue Mion, PLLC

(57) ABSTRACT

A pneumatic tire is mounted onto a rim with maximum loading, and with an air pressure corresponding to maximum loading, such that the ground contact shape has a gradually decreasing circumferential direction length from the tire width direction center to the portion corresponding towards the tire width direction outermost circumferential groove, followed by the ground contact shape having a gradually increasing circumferential direction length towards the tire width direction outside. In the ground contact shape, the relationships $0.02 \leq (A-B)/L \leq 0.1$, and $0.02 \leq (C-B)/L \leq 0.1$ are satisfied, in which A is the maximum length in the circumferential direction of the tire width direction outermost rib, L is the circumferential direction length of the tire width direction center, and B and C are distances in a tire circumferential direction which depend on the width of the tire width direction outermost rib and the width of the second rib from the outside in the tire width direction.

2 Claims, 8 Drawing Sheets

U.S. PATENT DOCUMENTS

2005/0092412 A1* 5/2005 Iizuka .................. 152/209.18

FOREIGN PATENT DOCUMENTS

| | | | |
|---|---|---|---|
| EP | 1 024 032 A2 | | 8/2000 |
| JP | 02-088311 A | | 3/1990 |
| JP | 3217304 A | | 9/1991 |
| JP | 05077608 A | | 3/1993 |
| JP | 7149113 A | | 6/1995 |
| JP | 10-264609 | * | 10/1998 |
| JP | 2829859 | * | 12/1998 |
| JP | 10315712 A | | 12/1998 |
| JP | 10338006 A | | 12/1998 |
| JP | 11034613 A | | 2/1999 |
| JP | 11-151911 | * | 6/1999 |
| JP | 2004333295 A | | 11/2004 |
| JP | 2005138609 A | | 6/2005 |
| JP | 2005153686 A | | 6/2005 |
| WO | 03035413 A1 | | 5/2003 |
| WO | 03051651 A1 | | 6/2003 |
| WO | 03/053722 | * | 7/2003 |

OTHER PUBLICATIONS

Machine translation for Japan 10-264609 (no date).*
Machine translation for Japan 2829859 (no date).*
Supplementary European Search Report for EP 05 75 3441 dated Dec. 23, 2008.

* cited by examiner

F I G. 7
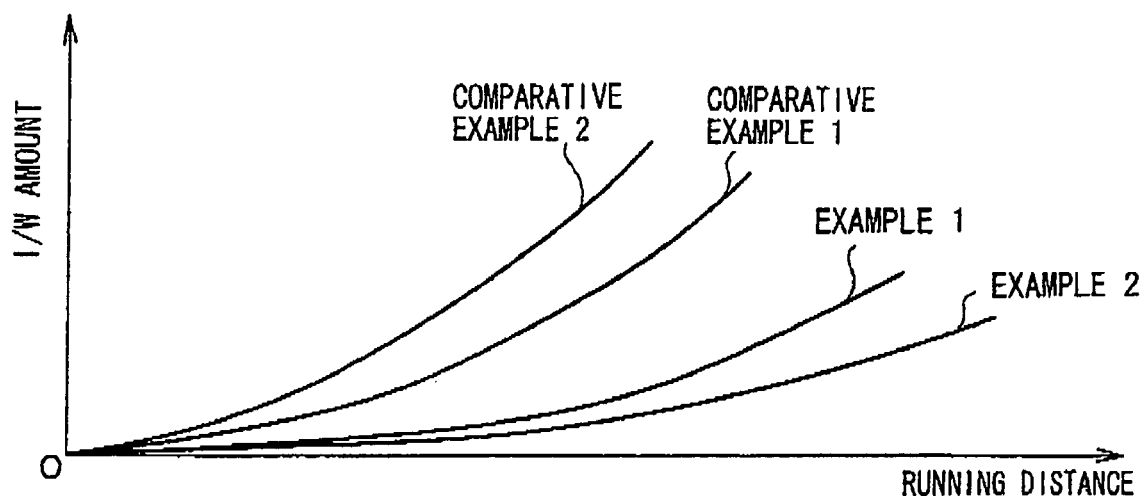

PNEUMATIC TIRE WITH TREAD HAVING GROUND CONTACT SHAPE AND UNEVEN WEAR SACRIFICIAL PROTRUSION

FIELD OF THE INVENTION

The present invention relates to a pneumatic tire, and in particular to a pneumatic tire that can suppress uneven wear that easily develops when the pneumatic tire is used on the steering axel of a heavily loaded vehicle.

BACKGROUND ART

In general, the shape of the ground contact portion (footprint) of a pneumatic tire is, for example, as shown at numeral 100 in FIG. 8, such that the length of the ground contact portion gradually reduces from the central portion toward the shoulder portion. However, with the rib pattern of the ground contact shape 100 uneven wear due to dragging in the vicinity of tread ground contact edge 102E is easily generated, and in order to suppress the above uneven wear the ground contact shape can be made close to a rectangular shape.

However, if the ground contact shape gets closer to rectangular, due to the variation in the conditions of tire manufacture and conditions of use, the length of the ground contact increases from the central portion to the shoulder portion to give the ground contact shape 104, and rib punch wear easily develops in the vicinity of the outer edge in the tire width direction at the second rib from the outer side rib 106 (the shaded portion of FIG. 9).

In order to solve this problem, a pneumatic tire has been proposed (see Patent Publication 1) with a ground contact pattern where the ground contact length first gets shorter from the central portion in the tire width direction to the tread ground contact edge side, and then the ground contact length gradually gets longer up to the tread ground contact edge.
Patent Publication 1: Japanese Patent Application Laid-Open (JP-A) No. 5-77608.

DESCRIPTION OF THE INVENTION

Problem to be Solved by the Invention

The pneumatic tire in Patent Publication 1, by considering the ground contact shape, can suppress uneven wear due to dragging in the vicinity of the tread ground contact edge and suppress shoulder scrubbing as a side force makes the tread edge rounded and this wear then progresses towards the center.

However, there is strong market demand to further suppress uneven wear.

The invention has been made with regard to the above problem to be solved and an object of the invention is to provide a pneumatic tire that is able to suppress uneven wear further than conventionally.

Means to Solve the Problems

As a result of carrying out a series of investigations and experiments, the inventors have been able to find a significant improvement in uneven wear by optimizing the relative proportions of the dimensions of the ground contact portions of the ribs separated by the circumferential grooves.

An aspect of an exemplary embodiment provides: a pneumatic tire provided with a tread including plural ribs separated by at least two circumferential direction grooves extending in a circumferential direction. When looking at the tread ground contact shape under conditions that the pneumatic tire is mounted onto a rim with maximum loading, and with an air pressure corresponding to maximum loading, the ground contact shape has a gradually decreasing circumferential direction length from the tire width direction center to the portion corresponding towards the tire width direction outermost circumferential groove, followed by the ground contact shape having a gradually increasing circumferential direction length towards the tire width direction outside. In the ground contact shape, the following relationships are satisfied:
$0.02 \leq (A-B)/L \leq 0.1$, and $0.02 < (C-B)/L \leq 0.1$. In these relationships: L is the circumferential direction length of the tire width direction center; A is the maximum length in the circumferential direction of the portion corresponding to the tire width direction outermost rib; Ws is the width of the portion corresponding to the tire width direction outermost rib; $W_2$ is the width of the portion corresponding to the second rib from the outside in the tire width direction; B is the distance in the tire circumferential direction between two points that are intersections of border lines of circumferential direction sides of the portion corresponding to the outermost rib, intersecting with a first virtual line extending in the tire circumferential direction and at a distance of $0.076W_s$ in the tire width direction to the outside from a border line of the portion corresponding to the outermost rib, the border line corresponding to an edge of a circumferential direction groove on the inside of the outermost rib in the tire width direction; and C is the distance in the tire circumferential direction between two points that are the intersections of border lines of circumferential direction sides of the portion corresponding to the second rib from the outside in the tire width direction, intersecting with a second virtual line that extends in the tire circumferential direction and is a distance of $0.112W_2$ to the inside in the tire width direction from a border line corresponding to the tire width direction outside circumferential direction groove edge of the portion corresponding to the second rib from the outside in the tire width direction.

Next, the operation of the pneumatic tire will be explained.

Uneven wear in the vicinity of the tread edge due to dragging and shoulder scrubbing wear can be suppressed more than conventionally. Under conditions that the pneumatic tire is mounted onto a rim with maximum loading, and with an air pressure corresponding to maximum loading, the ground contact shape has a gradually decreasing circumferential direction length from the tire width direction center to the portion corresponding towards the tire width direction outermost circumferential groove, followed by the ground contact shape having a gradually increasing circumferential direction length towards the tire width direction outside, and satisfies the following relationships: $0.02 \leq (A-B)/L \leq 0.1$, and $0.02 \leq (C-B)/L \leq 0.1$. In these relationships: L is the circumferential direction length of the tire width direction center; A is the maximum length in the circumferential direction of the portion corresponding to the tire width direction outermost rib; Ws is the width of the portion corresponding to the tire width direction outermost rib; $W_2$ is the width of the portion corresponding to the second rib from the outside in the tire width direction; B is the distance in the tire circumferential direction between two points that are intersections of border lines of circumferential direction sides of the portion corresponding to the outermost rib, intersecting with a first virtual line extending in the tire circumferential direction and at a distance of $0.076W_s$ in the tire width direction to the outside from a border line of the portion corresponding to the outermost rib, the border line corresponding to an edge of a circumferential direction groove on the inside of the outermost rib in the tire width direction; and C is the distance in the tire circumferential direction between two points that are the intersections of border lines of circumferential direction sides of the portion corresponding to the second rib from the outside in the tire width direction, intersecting with a second virtual line that extends in the tire circumferential direction and is a distance of $0.112W_2$ to the inside in the tire width direction from a border line corresponding to the tire width direction outside circumferential direction groove edge of the portion corresponding to the second rib from the outside in the tire width direction.

Here, if $(A-B)/L<0.02$ then uneven wear in the vicinity of the edge of the ground contact of the outermost rib in the tire width direction due to dragging easily occurs.

On the other hand, if $(A-B)/L>0.1$ then uneven wear in the vicinity of the inside edge portion of the tire width direction outermost rib due to dragging easily occurs.

Further, if $(C-B)/L<0.02$, then uneven wear in the vicinity of the edge of the ground contact of the second rib from the outside in the tire width direction due to dragging easily occurs.

On the other hand, $(C-B)/L>0.1$ then uneven wear in the vicinity of the inside edge portion of the tire width direction outermost rib easily occurs.

An aspect of another exemplary embodiment provides a pneumatic tire provided with a tread including plural ribs separated by at least two circumferential direction grooves extending in a circumferential direction wherein: R1 is less than R2, where, when looking at a cross-section of the tire along the rotational axis, R1 is a radius of curvature of a first running surface of the tread located on the tire equatorial plane side of a tire width direction outermost circumferential groove, and R2 is a radius of curvature of a second running surface of the tread located to the shoulder side of a tire width direction outermost circumferential main groove; the second running surface is located to the inside in the tire diameter direction of a virtual extension line of the first running surface; and further db is less than da, where da is a step height between the first running surface and a virtual extension line of the second running surface, and db is a step height at the edge of the ground contact of the tread between the second running surface and the virtual extension line of the first running surface. By being as above, the ground contact shape of the tread under conditions that the pneumatic tire is mounted onto a rim with maximum loading, and with an air pressure corresponding to maximum loading, has a gradually decreasing circumferential direction length from the tire width direction center to the portion corresponding towards the tire width direction outermost circumferential groove, followed by the ground contact shape having a gradually increasing circumferential direction length towards the tire width direction outside, and in the ground contact shape, the following relationships are satisfied: $0.02 \leq (A-B)/L \leq 0.1$, and $0.02 \leq (C-B)/L \leq 0.1$. In these relationships: L is the circumferential direction length of the tire width direction center; A is the maximum length in the circumferential direction of the portion corresponding to the tire width direction outermost rib; Ws is the width of the portion corresponding to the tire width direction outermost rib; $W_2$ is the width of the portion corresponding to the second rib from the outside in the tire width direction; B is the distance in the tire circumferential direction between two points that are intersections of border lines of circumferential direction sides of the portion corresponding to the outermost rib, intersecting with a first virtual line extending in the tire circumferential direction and at a distance of $0.076Ws$ in the tire width direction to the outside from a border line of the portion corresponding to the outermost rib, the border line corresponding to an edge of a circumferential direction groove on the inside of the outermost rib in the tire width direction, and C is the distance in the tire circumferential direction between two points that are the intersections of border lines of circumferential direction sides of the portion corresponding to the second rib from the outside in the tire width direction, intersecting with a second virtual line that extends in the tire circumferential direction and is a distance of $0.112W_2$ to the inside in the tire width direction from a border line corresponding to the tire width direction outside circumferential direction groove edge of the portion corresponding to the second rib from the outside in the tire width direction.

Next, the operation of the pneumatic will be explained.

R1 is less than R2, where, when looking at a cross-section of the tire along the rotational axis, R1 is a radius of curvature of a first running surface of the tread located on the tire equatorial plane side of a tire width direction outermost circumferential groove, and R2 is a radius of curvature of a second running surface of the tread located to the shoulder side of a tire width direction outermost circumferential main groove; the second running surface is located to the inside in the tire diameter direction of a virtual extension line of the first running surface; and further db is less than da, where da is a step height between the first running surface and a virtual extension line of the second running surface, and db is a step height at the edge of the ground contact of the tread between the second running surface and the virtual extension line of the first running surface. By being as above, the ground contact shape of the tread under conditions that the pneumatic tire is mounted onto a rim with maximum loading, and with an air pressure corresponding to maximum loading, can be made to have a gradually decreasing circumferential direction length from the tire width direction center to the portion corresponding towards the tire width direction outermost circumferential groove, followed by the ground contact shape having a gradually increasing circumferential direction length towards the tire width direction outside. That is, it is possible to easily obtain such a ground contact shape by the running surface cross-section, without depending on the internal structure of the tire.

Uneven wear in the vicinity of the tread edge due to dragging and shoulder scrubbing wear can be suppressed more than conventionally by the ground contact shape of the tread, under conditions that the pneumatic tire is mounted onto a rim with maximum loading, and with an air pressure corresponding to maximum loading, having a gradually decreasing circumferential direction length from the tire width direction center to the portion corresponding towards the tire width direction outermost circumferential groove, followed by the ground contact shape having a gradually increasing circumferential direction length towards the tire width direction outside, and the following relationships being satisfied: $0.02 \leq (A-B)/L \leq 0.1$, and $0.02 \leq (C-B)/L \leq 0.1$. In these relationships: L is the circumferential direction length of the tire width direction center; A is the maximum length in the circumferential direction of the portion corresponding to the tire width direction outermost rib; Ws is the width of the portion corresponding to the tire width direction outermost rib; $W_2$ is the width of the portion corresponding to the second rib from the outside in the tire width direction; B is the distance in the tire circumferential direction between two points that are intersections of border lines of circumferential direction sides of the portion corresponding to the outermost rib, intersecting with a first virtual line extending in the tire circumferential direction and at a distance of $0.076Ws$ in the tire width direction to the outside from a border line of the portion corresponding to the outermost rib, the border line corresponding to an edge of a circumferential direction groove on the inside of the outermost rib in the tire width direction; and C is the distance in the tire circumferential direction between two points that are the intersections of border lines of circumferential direction sides of the portion corresponding to the second rib from the outside in the tire width direction, intersecting with a second virtual line that extends in the tire circumferential direction and is a distance of $0.112W_2$ to the inside in the tire width direction from a border line corresponding to the tire width direction outside circumferential direction groove edge of the portion corresponding to the second rib from the outside in the tire width direction.

Here, if $(A-B)/L<0.02$ then uneven wear in the vicinity of the edge of the ground contact of the outermost rib in the tire width direction due to dragging easily occurs.

On the other hand, if $(A-B)/L>0.1$ then uneven wear in the vicinity of the inside edge portion of the tire width direction outermost rib easily occurs.

Further, if $(C-B)/L<0.02$, then uneven wear in the vicinity of the edge of the ground contact of the second rib from the outside in the tire width direction due to dragging easily occurs.

On the other hand, $(C-B)/L>0.1$ then uneven wear in the vicinity of the inside edge portion of the tire width direction outermost rib easily occurs.

An uneven wear sacrificial protrusion with a peak portion thereof positioned lower than the road surface and that contacts the road surface during ground contact is formed at at least the bottom of the tire direction outermost circumferential groove.

Since there is a difference in the diameter of the tread running surface an the diameter of the peak portion of the uneven wear sacrificial protrusion, when the tire is rotated and contacts the road surface, there is dragging of the uneven wear sacrificial protrusion relative to the road surface and abrasion of the uneven wear sacrificial protrusion, and uneven wear of the ribs that are adjacent to the circumferential groove can be further suppressed. Furthermore, progression of uneven wear towards the center side can be suppressed.

Indentation portions are formed in the tire width direction outermost rib at the side face thereof outside in the tire width direction of the tread ground contact shape edge, reducing the rigidity of the rib.

Next, the operation of the pneumatic tire will be explained.

By forming indentation portions in the tire width direction outermost rib at the side face thereof outside in the tire width direction of the tread ground contact shape edge, the rigidity of the rib in the vicinity of the tread ground contact edge is reduced, and the frictional force with the road surface is reduced, and so generation of uneven wear can be suppressed.

Effect of the Invention

By the above construction of the pneumatic tires, an excellent effect can be obtained that, as explained above, uneven wear can be suppressed more than conventionally.

By the above construction of the pneumatic tire, an excellent effect can be obtained that uneven wear of the ribs, adjacent to the circumferential groove in which the uneven wear sacrificial protrusion is formed, can be further suppressed, and progression of uneven wear toward the center side can be suppressed.

By the above construction of the pneumatic tire, an excellent effect can be obtained that the generation of uneven wear of the tire width direction outermost rib in the vicinity of the tread ground contact edge can be further suppressed.

BRIEF DESCRIPTION OF THE DRAWINGS

FIG. 7 is a graph showing the experimental results of wear tests;

BEST MODE OF THE INVENTION

First Embodiment

Details of a pneumatic tire 10 according to a first embodiment of the invention will be explained below with reference to the drawings.

The first embodiment of the invention will be explained with reference to FIG. 1 and FIG. 2.

Figure 2:
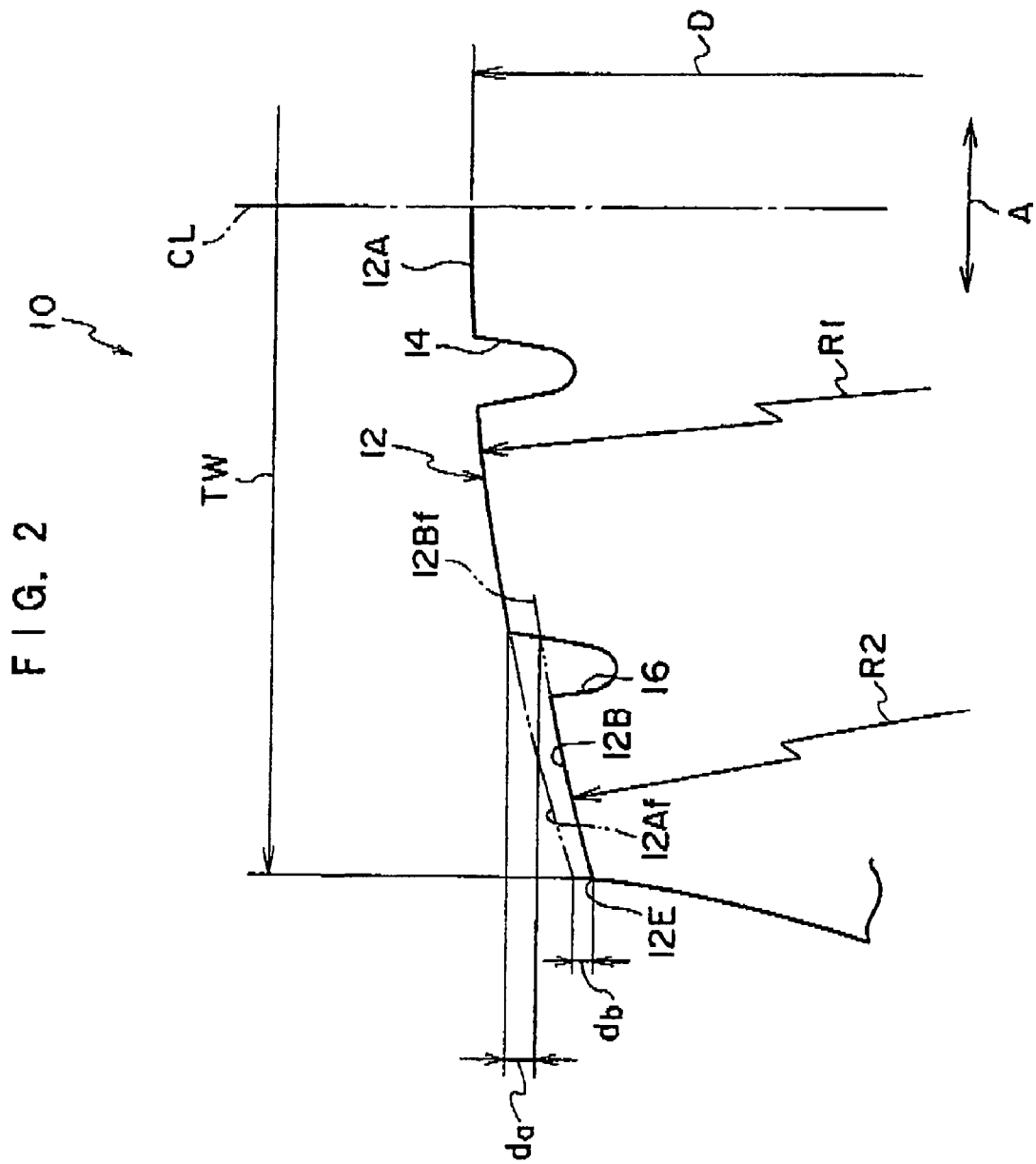
FIG. 2 is a tread cross-section along the tire rotational axis direction of a pneumatic tire of the first embodiment of the invention.

As shown in FIG. 2, the tread 12 of the pneumatic tire 10 is provided, on each side in the tire width direction (in the direction of arrow A) of the equatorial plane of the tire CL, with a first circumferential direction main groove 14 extending around the periphery of the tire (one side is omitted in FIG. 2), and, on the outside of the first circumferential direction main groove 14 in the tire width direction, a second circumferential direction main groove 16 extending around the periphery of the tire (one side is omitted in FIG. 2).

The first circumferential direction main groove 14 and the second circumferential direction main groove 16 of the first embodiment of the invention both extend linearly with a constant width around the tire circumferential direction.

Figure 1:
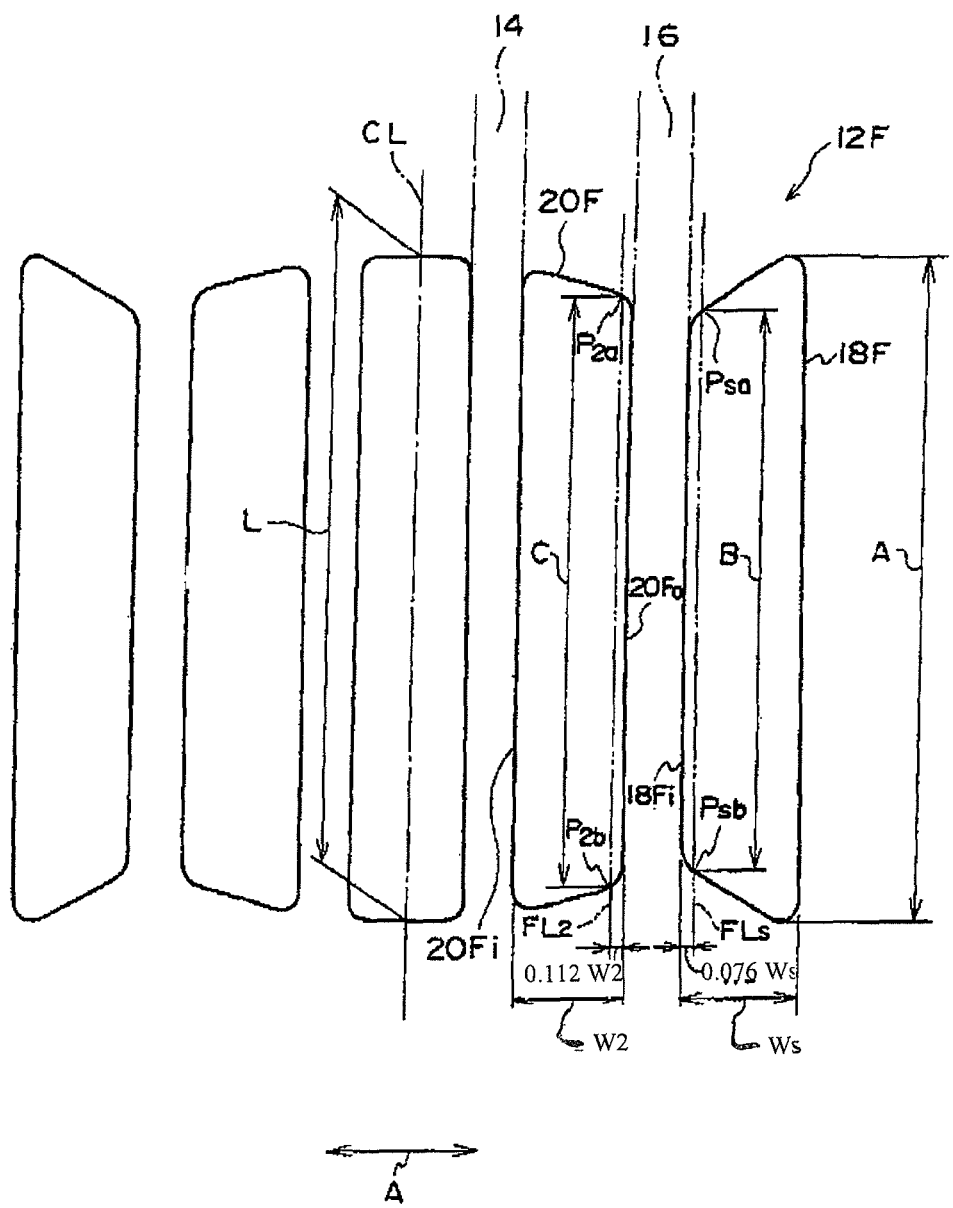
FIG. 1 shows a ground contact shape of a pneumatic tire according to a first embodiment of the invention.

FIG. 1 shows the ground contact shape 12F of the tread 12 of this pneumatic tire 10 under conditions that the pneumatic tire is mounted onto a rim with maximum loading, and with an air pressure corresponding to maximum loading.

As is shown in FIG. 1, the circumferential direction length of the ground contact shape 12F gradually decreases from the center in the tire width direction towards the second circumferential direction main groove 16 at the outside in the tire width direction. After that, the circumferential direction length of the ground contact shape 12F then gradually increases towards the outside in the tire width direction.

In this ground contact shape, the circumferential direction length of the tire width direction center is designated L, the maximum length in the circumferential direction of the border line 18F of the ground contact shape of shoulder rib 18 is designated A, the width of the border line 18F of the ground contact shape of shoulder rib 18 is designated Ws, the width of the border line 20F of the ground contact shape of second rib 20 is designated $W_2$, and in the ground contact shape of the shoulder rib 18, B is designated for the distance in the tire circumferential direction between two points Psa and Psb that are the intersections of a first virtual line FLs (that extends in the tire circumferential direction and is a distance of 0.076Ws to the outside in the tire width direction from the border line 18Fi corresponding to the edge of the second circumferential direction main groove 16) and the border line 18F.

In the ground contact shape of the second rib 20, C is designated for the distance in the tire circumferential direction between two points $P_2a$ and $P_2b$ that are the intersections of a second virtual line $FL_2$ (that extends in the tire circumferential direction and is a distance of $0.112W_2$ to the inside in the tire width direction from the border line 20Fo corresponding to the edge of the second circumferential direction main groove 16) and the border line 20F.

The relationships are satisfied that:

$$0.02 \leq (A-B)/L \leq 0.2, \text{ and } 0.02 \leq (C-B)/L \leq 0.18.$$

It is more preferable that these relationships are satisfied:

$$0.05 \leq (A-B)/L \leq 0.15, \text{ and } 0.03 \leq (C-B)/L \leq 0.13.$$

In order to provide such ground contact shapes, the sectional shape of the tread 12 of the pneumatic tire 10 of the current embodiment is set in the following manner.

The running surface of tread 12, as seen in FIG. 2 cross section of tread 12 along the tire rotational axis direction, has a radius of curvature R1 (with the center of curvature on the tire inside) of the running surface 12A at the side of the equatorial plane CL of the second circumferential direction main groove 16, and a radius of curvature R2 (with the center of curvature on the tire inside) that is larger than R1 of the running surface 12B at the shoulder side of the second circumferential direction main groove 16.

Further, the running surface 12B is positioned overall to the inside in the tire diameter direction of a virtual line 12Af that is an extension of the running surface 12A.

In order to satisfy $0.02 \leq (A-B)/L \leq 0.1$, and $0.02 \leq (C-B)/L \leq 0.1$, for example, the height of the running surface 12B of the shoulder rib 18, the slope angle of running surface 12B, and the radius of curvature of running surface 12B may be adjusted in correspondence with the second rib 20 on the inside.

For the pneumatic tire 10 of the present embodiment, as seen in FIG. 2, the ground contact shape 12F as shown in FIG. 1 is obtained by setting the amount of step to be da at the edge portion of the second circumferential direction main groove 16 on the equatorial plane CL side between the running surface 12A and a virtual extension line 12Bf extended out from running surface 12B, and setting the amount of step to be db (<da) at the tread ground contact edge 12E between the virtual extension line 12Af extended out from running surface 12A and the running surface 12B.

Here, in the first embodiment, first circumferential direction main groove 14 and the second circumferential direction main groove 16 extend linearly at a constant width in the circumferential direction, however, they may extend in a zig-zag shape.

For example, if the first circumferential direction main groove 14 and the second circumferential direction main groove 16 are a zig-zag shape, then border line 18Fi, border line 20Fo and border line 20Fi are zig-zag shape, and in this case Ws and $W_2$ are calculated using the average positions around one circumference of the tire.

(Operation)

By setting the above cross section shape and ground contact shape of tread 12, uneven wear in the vicinity of the tread edge by dragging and shoulder scrubbing wear can be suppressed more than conventionally.

Here, if $(A-B)/L<0.02$, since ground contact length A becomes shorter, uneven wear due to dragging in the vicinity of the tread edge of shoulder rib 18 easily arises.

On the other hand, if $(A-B)/L>0.1$, the ground contact length A becomes longer than necessary, and uneven wear of the tread edge portion on the inside in the tire width direction of shoulder rib 18 easily arises.

If $(C-B)/L<0.02$, since ground contact length C becomes shorter, uneven wear due to dragging in the vicinity of the tread edge of second rib 20 easily arises On the other hand, if $(C-B)/L>0.1$, the ground contact length B becomes shorter, and uneven wear of the tread edge portion on the inside in the tire width direction of shoulder rib 18 easily arises.

Here, for the tread ground contact edges of the present embodiment, the pneumatic tire 10 was mounted on a standard rim as defined in the JATMA YEAR BOOK (the Japan Automobile Tyre Manufacturers Association Specifications; 2003 Edition), inflation was to an air pressure (maximum air pressure) of 100% of the air pressure corresponding to the maximum permissible load (bold load figures in the table of internal pressure against load bearing ability) in the application size ply rating according to the JATMA YEAR BOOK, at the time of loading with the to the maximum permissible load. In the location of use and manufacturing locations, when TRA Specifications and ETRTO Specifications are used, various specifications are followed.

Second Embodiment

Next, a pneumatic tire 10 according to the second embodiment will be explained with reference to FIG. 3. Here, similar structures to the first embodiment are given the same numeral, and explanation thereof is omitted.

Figure 3:
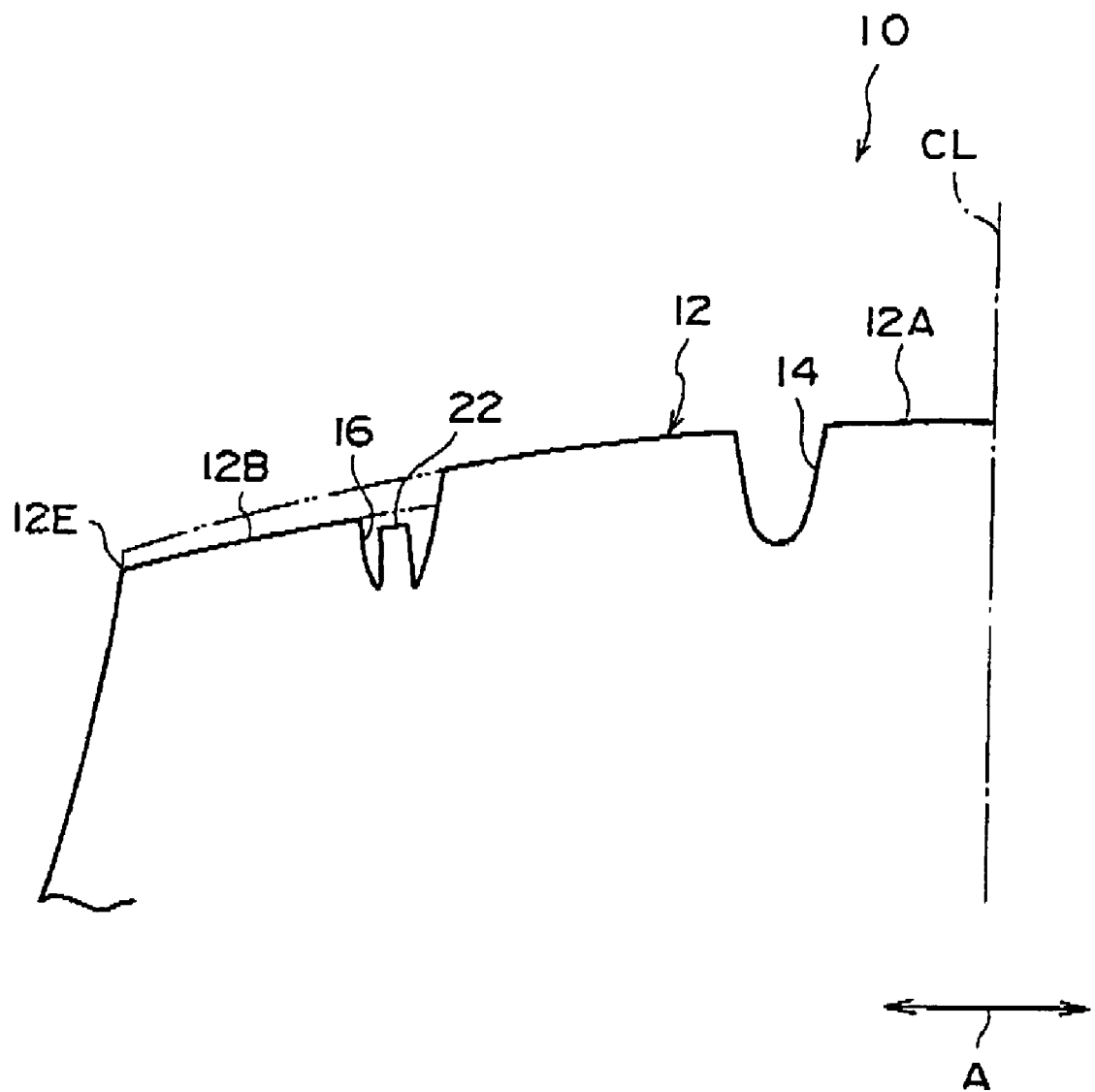
FIG. 3 is a tread cross-section along the tire rotational axis direction of a pneumatic tire of a second embodiment of the invention.

As can be seen from FIG. 3, in the groove bottom of the second circumferential direction main groove 16 is formed a uneven wear sacrificial protrusion 22 with a peak portion thereof that is set at a position that is lower than the running surfaces 12A, B, and that is in contact with the road surface during ground contact.

Since there is a difference between the diameter of the tread 12 running surfaces and the diameter of the peak portion of uneven wear sacrificial protrusion 22, when the tire is rotating and in contact with the road surface, the uneven wear sacrificial protrusion 22 drags relative to the road surface and wears, and uneven wear can be suppressed in the vicinity of the edge portion at the second circumferential direction main groove 16 side of the shoulder rib 18 and in the vicinity of the edge portion at the second circumferential direction main groove 16 side of second rib 20.

Further, progression of the uneven wear of shoulder rib 18 toward the center side can be suppressed.

Third Embodiment

Next, a pneumatic tire 10 according to the third embodiment will be explained with reference to FIG. 4. Here, similar structures to the first embodiment are given the same numeral, and explanation thereof is omitted.

Figure 4:
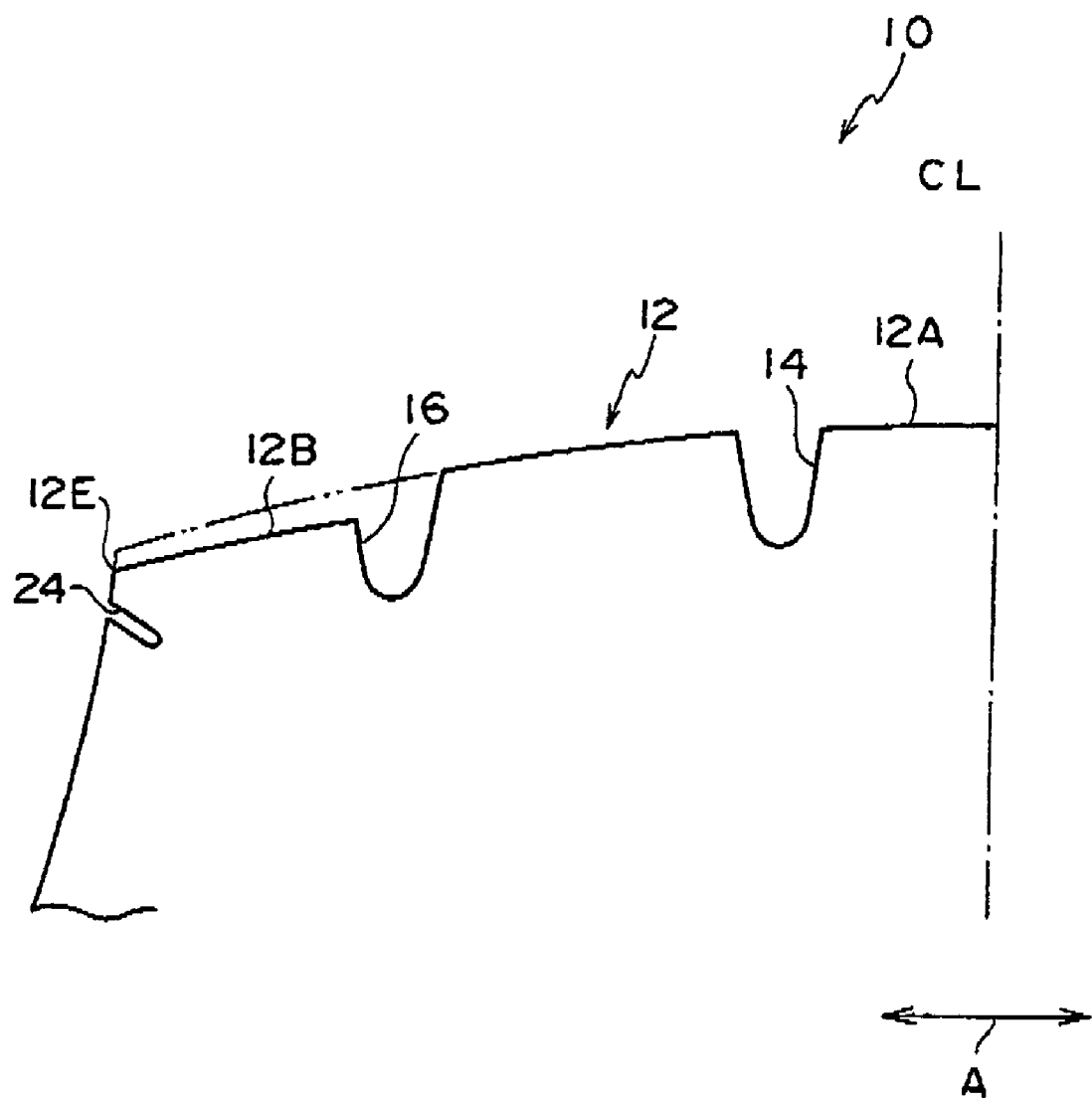
FIG. 4 is a tread cross-section along the tire rotational axis direction of a pneumatic tire of a third embodiment of the invention.

As shown in FIG. 4, the pneumatic tire 10 of the present embodiment has a fine groove 24 formed on the side face of shoulder rib 18 further to the tire axel direction side than the tread ground contact edge 2E.

By this fine groove 24, the rigidity in the vicinity of the tread ground contact edge of shoulder rib 18 is reduced, and a frictional force with the road surface is lowered, and the generation of uneven wear in the vicinity of the tread ground contact edge of shoulder rib 18 can be suppressed.

Here, the fine groove 24 may be formed to be intermittent in the circumferential direction, and may be substituted by forming plural holes (indentations).

(Experimental Tests)

In order to verify the effect of the invention two types of conventional pneumatic tire, and Examples of two types of pneumatic tire according the invention were prepared, and abrasion testing was carried out.

Figure 5:
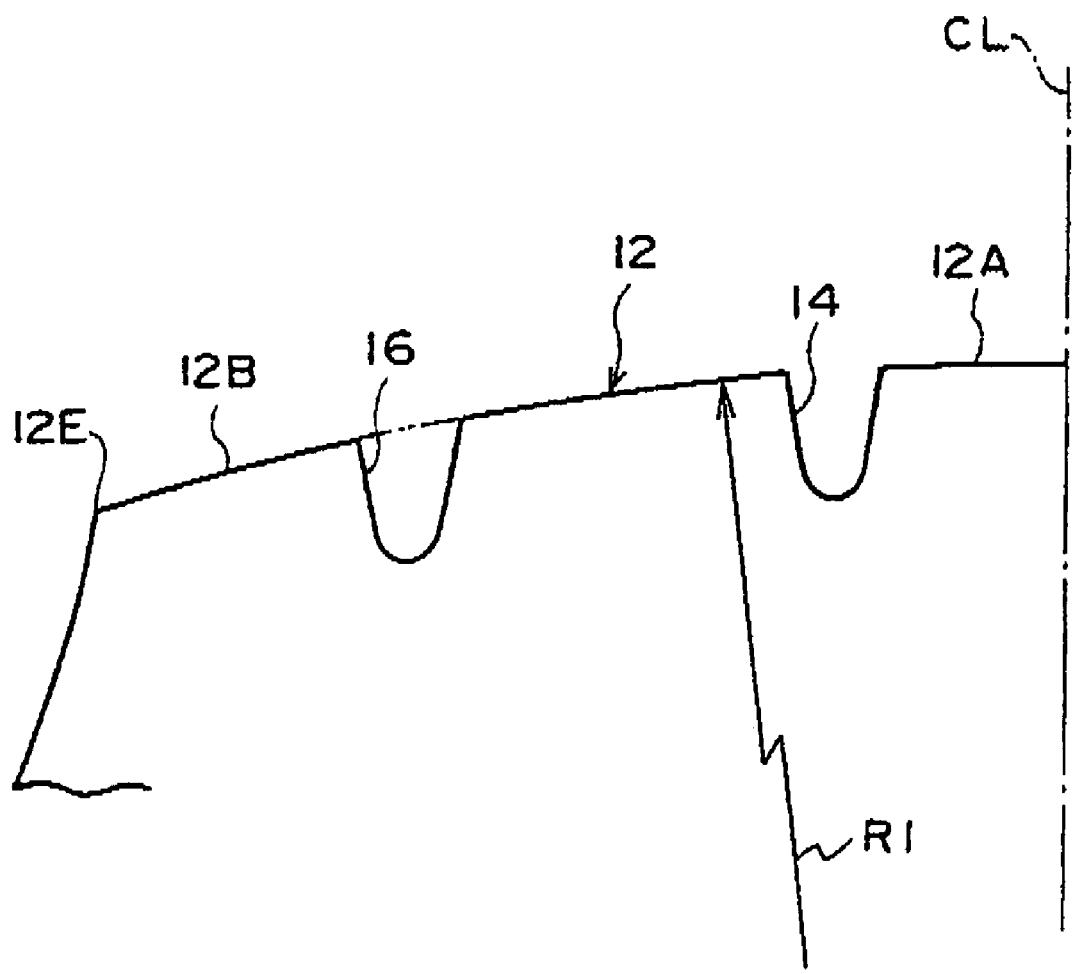
FIG. 5 is a tread cross-section along the tire rotational axis direction of a pneumatic tire of a Comparative Example 1.

The cross section of the Comparative Example 1, as can be seen in FIG. 5, has a uniform radius of curvature of the running surfaces (R1). The relationships of A, B, C and L are shown in Table 1 below.

Figure 6:
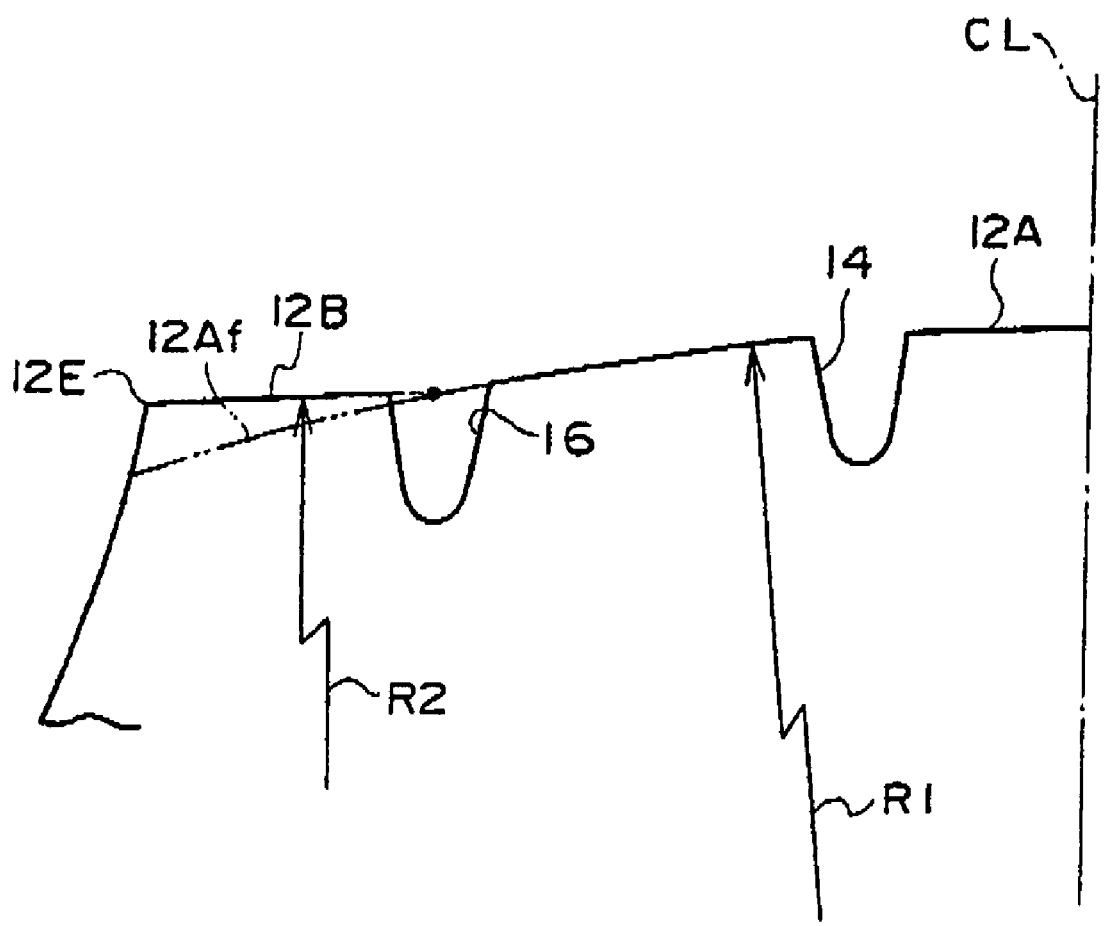
FIG. 6 is a tread cross-section along the tire rotational axis direction of a pneumatic tire of a Comparative Example 2.
Figure 8:
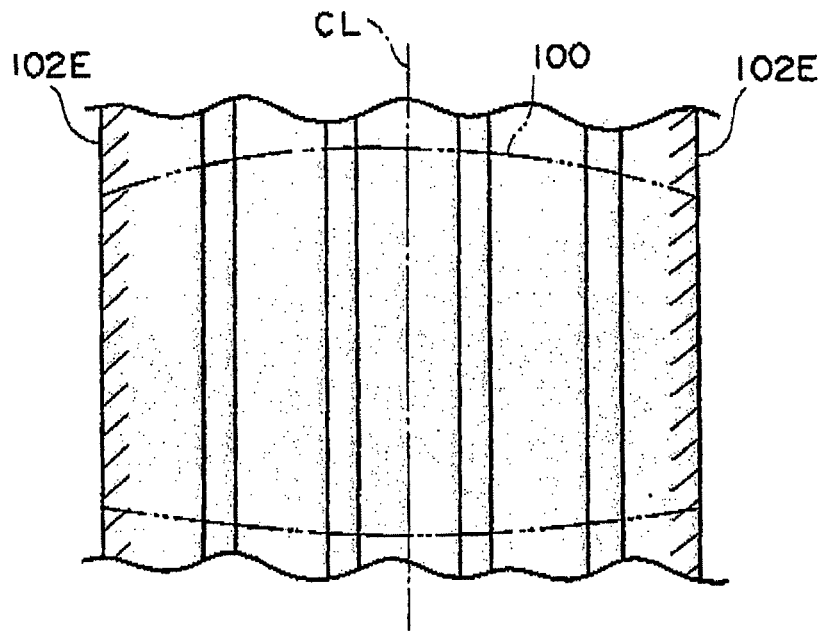
FIG. 8 is a tread plan view showing a conventional ground contact shape.
Figure 9:
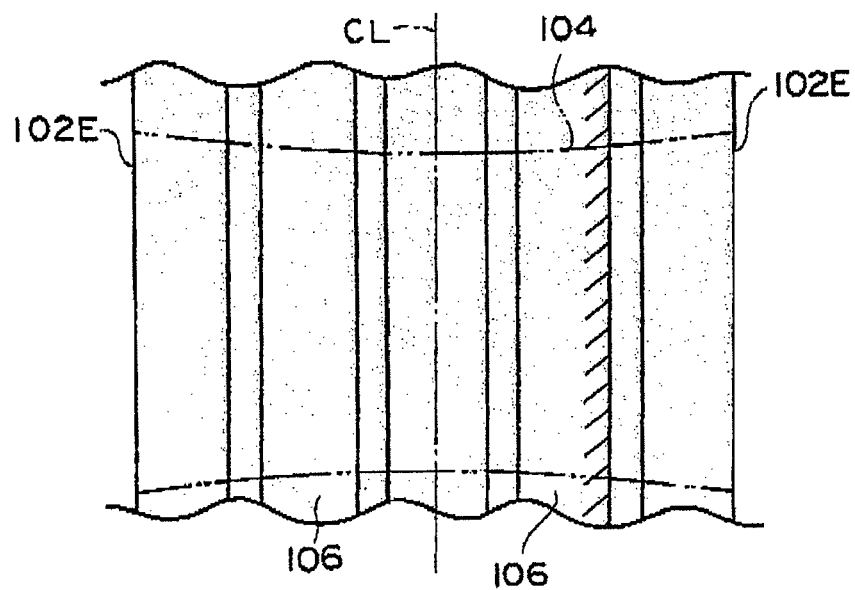
FIG. 9 is a tread plan view showing another conventional ground contact shape.

The cross sectional shape of Comparative Example 2, as can be seen from FIG. 6, the radius of curvature of the running surface 12A on the tire equatorial plane CL side of the second circumferential direction main groove 16 is R1, and the running surface 12B on the tread ground contact edge 12E side has a radius of curvature R2, and the running surface 12B is disposed toward the outside in the tire diameter direction to a virtual extension line 12Af that is an extension of running surface 12A. The relationships of A, B, C and L are shown in Table 1 below.

Pneumatic tires of Examples 1, 2 have cross sections according to FIG. 2. The relationships of A, B, C and L are shown in Table 1 below.

The tire sizes are all 295/75R22.5, and the rim sizes are all 8.25×22.5.

The abrasion test method and evaluation method were: North American market, after mounting the test tires to test vehicles (5 vehicles for each test) and running for 100,000 km, the amount of abrasion was measured. In the evaluation, shown is an inverse (reciprocal) index with the amount of abrasion of the Comparative Example 1 set at 100, and the larger the figure shown the higher the performance (change-over life).

The experimental results are shown in the Table 1 below and FIG. 7.

TABLE 1

|  | Comparative Example 1 | Comparative Example 2 | Example 1 | Example 2 |
|---|---|---|---|---|
| (A − B)/L | −0.05 | 0.01 | 0.04 | 0.07 |
| (C − B)/L | 0 | −0.01 | 0.05 | 0.04 |
| Portion developing I/W | Shoulder Rib | Second Rib | Shoulder Rib | Shoulder Rib |
| Change-over life index | 100 | 90 | 120 | 125 |

It can be seen from the results of the tests that uneven wear in the tires according to the invention is not as much as the uneven wear of the tires of the Comparative Examples, and the change-over life is longer.

INDUSTRIAL APPLICABILITY

By optimizing the ground contact shape it is possible to suppress uneven wear that can easily develop on tires when used on the steering axel of a heavily loaded vehicle, and it is applicable when uneven wear suppression is desired.

EXPLANATION OF THE NUMERALS

10 pneumatic tire
12 tread
12E tread ground contact edge
14 first circumferential direction main groove
16 second circumferential direction main groove
18 shoulder rib
20 second rib
22 uneven wear sacrificial protrusion
24 fine groove (indentation)

What is claimed:

1. A pneumatic tire provided with a tread including a plurality of ribs separated by at least two circumferential direction grooves extending in a circumferential direction wherein:

by R1 being less than R2, where, when looking at a cross-section of the tire along the rotational axis, R1 is a radius of curvature of a first running surface of the tread located on the tire equatorial plane side of a tire width direction outermost circumferential groove, and R2 is a radius of curvature of a second running surface of the tread located to the shoulder side of a tire width direction outermost circumferential main groove, and the second running surface being located to the inside in the tire diameter direction of a virtual extension line of the first running surface; and further by db being less than da, where da is a step height between the first running surface and a virtual extension line of the second running surface, and db is a step height at the edge of the ground contact of the tread between the second running surface and the virtual extension line of the first running surface;

the ground contact shape of the tread under conditions that the pneumatic tire is mounted onto a rim with maximum loading, and with an air pressure corresponding to maximum loading, has a gradually decreasing circumferential direction length from the tire width direction center to the portion corresponding towards the tire width direction outermost circumferential groove, followed by the ground contact shape having a gradually increasing circumferential direction length towards the tire width direction outside, and in the ground contact shape, the following relationships are satisfied:

$0.02 \leq (A-B)/L \leq 0.1$, and $0.02 \leq (C-B)/L \leq 0.1$, wherein

L is the circumferential direction length of the tire width direction center,

A is the maximum length in the circumferential direction of the portion corresponding to a tire width direction outermost rib, Ws is the width of the portion corresponding to the tire width direction outermost rib, $W_2$ is the width of the portion corresponding to the second rib from the outside in the tire width direction, B is the distance in the tire circumferential direction between two points that are intersections of border lines of circumferential direction sides of the portion corresponding to the outermost rib, intersecting with a first virtual line extending in the tire circumferential direction and at a distance of 0.076Ws in the tire width direction to the outside from a border line of the portion corresponding to the outermost rib, the border line corresponding to an edge of a circumferential direction groove on the inside of the outermost rib in the tire width direction, and C is the distance in the tire circumferential direction between two points that are the intersections of border lines of circumferential direction sides of the portion corresponding to the second rib from the outside in the tire width direction, intersecting with a second virtual line that extends in the tire circumferential direction and is a distance of $0.112W_2$ to the inside in the tire width direction from a border line corresponding to a tire width direction outside circumferential direction groove edge of the portion corresponding to the second rib from the outside in the tire width direction, an uneven wear sacrificial protrusion with a peak portion thereof positioned lower than the tire width direction outside circumferential direction groove edge of the portion corresponding to the tire width direction outermost rib and that contacts a road surface during ground contact is formed at at least the bottom of the tire width direction outermost circumferential groove.

2. The pneumatic tire according to claim 1, wherein indentation portions are formed in the tire width direction outermost rib at a side face thereof outside in the tire width direction of the tread ground contact shape edge, reducing the rigidity of the rib.

* * * * *